United States Patent [19]

Anderson et al.

[11] Patent Number: 4,545,043

[45] Date of Patent: Oct. 1, 1985

[54] ANNOUNCEMENT SYSTEM MESSAGE PLAYBACK ARRANGEMENT

[75] Inventors: Thomas W. Anderson; Richard J. Milczarek, both of Warrenville; Carl H. Peters, Lisle, all of Ill.

[73] Assignee: AT&T Bell Laboratories, Murray Hill, N.J.

[21] Appl. No.: 380,511

[22] Filed: May 21, 1982

[51] Int. Cl.[4] .................. G11B 17/22; G11B 7/00; G11B 21/08; H04M 11/00
[52] U.S. Cl. ........................... 369/32; 369/43; 360/78; 179/6.04; 364/200; 364/900
[58] Field of Search .............. 364/200, 900; 369/32, 369/33, 34, 36, 69, 43; 340/825.25, 825.26, 829.27, 829.54, 825.55; 179/6.04, 6.06, 6.08, 6.09, 6.1, 6.17; 360/12, 78

[56] References Cited

U.S. PATENT DOCUMENTS

| Re. 26,919 | 6/1970 | Hagelburger et al. | 364/900 |
|---|---|---|---|
| 3,568,155 | 3/1971 | Abraham et al. | 364/900 X |
| 4,054,756 | 10/1977 | Comella et al. | 179/18 |
| 4,099,233 | 7/1978 | Barbagelata et al. | 364/200 |
| 4,214,305 | 7/1980 | Tokita et al. | 364/200 |
| 4,270,154 | 5/1981 | Crawford | 360/98 |
| 4,357,493 | 11/1982 | Anderson et al. | 360/12 X |

*Primary Examiner*—Aristotelis M. Psitos
*Attorney, Agent, or Firm*—Richard J. Godlewski; Charles H. Davis

[57] ABSTRACT

A telephone switching network is disclosed having an announcement system coupled to a toll switching center.

A plurality of short phrases are recorded in corresponding sectors of a disc store and announcements are assembled in real time by concatenating the appropriate phrases. Initial requests for announcements are sorted so that the reading heads seek across the disc in a straight line in a first direction to play back the recorded phrases. Any additional requests for playback received while the initial requests are being played back, are sorted in the opposite order for playback while the heads are driven in a second direction to their original position. All further requests are combined with any unfinished work for playback as the heads once again move in the first direction.

The method of playing back while traversing the disc in both directions shortens the waiting interval for the listeners.

11 Claims, 14 Drawing Figures

BASE CYCLE OPERATION (CONT.)

BASE CYCLE OPERATION
(CONT.)

FLYBACK SUBROUTINE

PREPROCESSING SUBROUTINE

FIG. 9    PREPROCESSING SUBROUTINE (CONT.)

PREPROCESSING SUBROUTINE (CONT)

NXATUD SUBROUTINE (CONT)

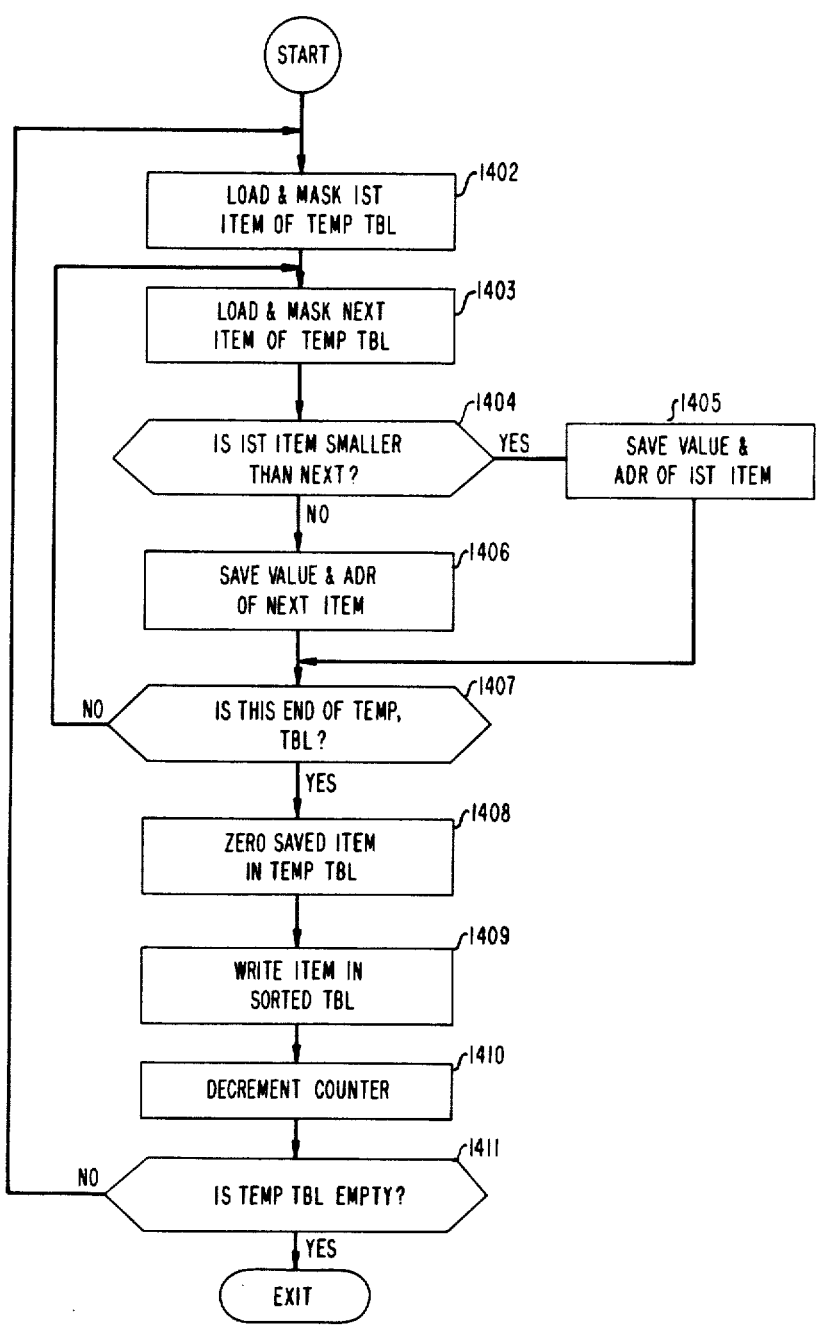

ANNOUNCEMENT SYSTEM MESSAGE PLAYBACK ARRANGEMENT

TECHNICAL FIELD

This invention relates to communication systems, and in particular, to systems for storing and rapidly distributing announcements to a large number of customers. In a more particular aspect, this invention relates to telephone systems and particularly to arrangements for assembling and transmitting messages over a telephone network. In a still more particular aspect, this invention relates to a method and apparatus for storing portions of messages that are assembled into announcements in real time for transmittal to telephone customers.

BACKGROUND OF THE INVENTION

A communications network such as a telephone network, has become more than a facility for merely permitting two geographically remote customers to engage in private conversation. Many special services are now being offered such as audio conferencing, video conferencing, credit card calling and special billing, etc. While these services can be provided through the use of an attendant, it is more desirable to fully automate these services without attendant intervention.

These special services, however, require the customer to perform tasks not normally encountered in the average station to station call. For example, the customer may be required to dial a special series of digits to initiate the call and then send additional digits during the call to cause other action to take place.

An example of this might be in the establishment of a conference call whereby the caller dials a code to access the conference circuit and then dials another code to add a conferee or to subtract a conferee from the conference call.

To advise a customer of the necessary procedures for making these calls, it is desirable to give the customer instructions over the telephone at the time action has to be taken. Thus, if a customer makes a mistake in dialing, a new instruction can be automatically given to prompt the customer to correct the mistake. Likewise, if alternative services are available, the customer can be informed automatically of what the alternative services are and what action must be taken to implement each service.

Providing a multiplicity of announcements in real time requires a large capacity store that can be rapidly accessed so as not to keep customers waiting.

One such arrangement is disclosed in the copending U.S. patent application of T. W. Anderson et al., U.S. Ser. No. 232,999, filed Feb. 9, 1981 now U.S. Pat. No. 4,357,493. In the Anderson et al. disclosure, complete announcements are stored on a rotating disc store having multiple reading heads. Each announcement is repeated in a plurality of locations on the discs and these locations are arranged in staggered relationship to each other so that in real time one of the reading heads is always near the beginning phrase of one copy of the announcement. The discs are continuously read so that each copy is loaded into a corresponding playback buffer. Thus, selection of a buffer assures prompt access to the beginning of an announcement.

While the Anderson et al. arrangement is suitable for its intended purpose, it requires that several copies of each announcement be stored, and this uses valuable storage capacity which is undesirable when a large repetoire of high quality speech must be stored. Also, all announcements must be fully assembled before they are entered in the store, and the arrangement does not lend itself to assembling in real time, unique announcements from a plurality of short phrases which may be common to many announcements. Thus, the average waiting time for an announcement with the staggered disc arrangement is unacceptably long for the present application.

SUMMARY OF THE INVENTION

The foregoing problem is solved and a technical advance is achieved by a processor controlled announcement system using a disc store wherein the disc is divided into a plurality of segments each containing a short phrase. The disc is read and the phrases concatenated in real time to form a complete announcement. More specifically, when the announcement system receives a plurality of requests to play back several phrases, it sorts the requests so that the reading heads will traverse the shortest distance as they move in a forward direction across the disc. During the time that the first requests are being played, any additional requests that are received are sorted and arranged in the reverse order so that they may be read most efficiently as the reading heads move backward across the disc to their point of origin. If further requests are received during this latter interval or if all requests have not been played during the return of the heads, the requests are once again sorted and played as the heads move in the forward direction.

BRIEF DESCRIPTION OF THE DRAWING

FIG. 14 shows the subroutine SORT which causes the peripheral interface controller to arrange the playback orders that are to be executed in a manner which minimizes head seeking when the reading heads are moved across the discs in the forward or backward direction.

DETAILED DESCRIPTION

Figure 1:
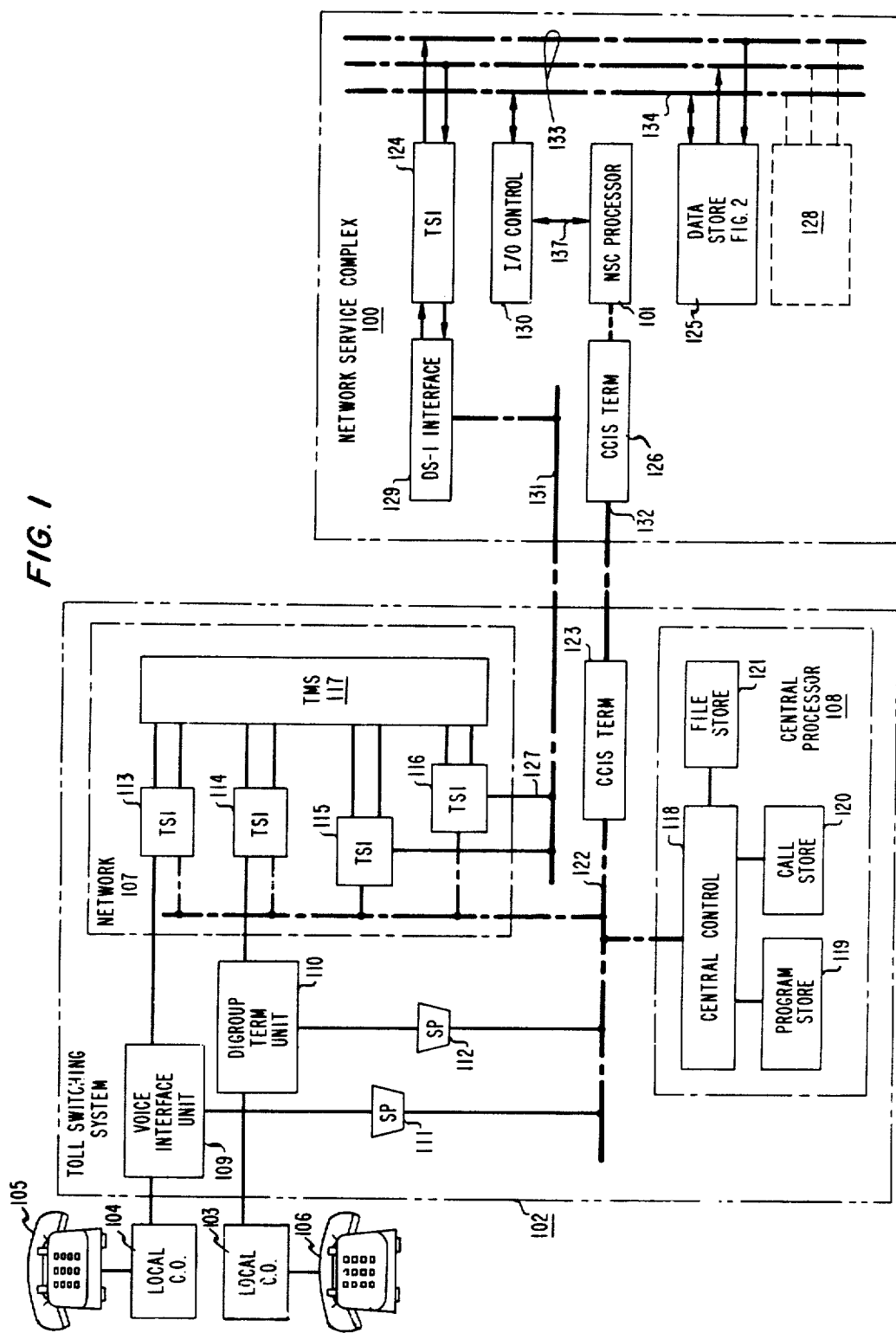
FIG. 1 shows a block diagram of a telephone network having a toll switching system equipped with a network services complex for providing various announcements and other services.

The general organization of a system employing the invention is illustrated in the block diagram of FIG. 1 which shows a typical communications network having a toll switching system 102 which serves local telephone central offices 103 and 104. Central offices 103 and 104 contain the switching apparatus for providing telephone service to customer stations 105 and 106, respectively. Connected to switching system 102 is a network services complex 100 for providing special services such as teleconferencing.

Network services complex 100 includes NSC processor 101, data store 125 and other units. As will be described in more detail below, one of the functions of complex 100 is to provide announcements and instructions to customers over the telephone network via the toll and local switching offices.

Toll switching system 102, as depicted in FIG. 1, is a typical electronic switching system, such as, the system described in detail in the *Bell System Technical Journal*, Vol. 56, No. 7, September 1977, and need not be fully described herein for the reader to understand the present invention.

Switching system 102 comprises a network 107, a central processor 108, voice interface unit 109, digroup terminal unit 110, signal processors 111 and 112, and miscellaneous equipment units that have not been shown to simplify the drawing.

Network 107 has a time-space-time switching configuration utilizing time slot interchange (TSI) units 113–116 and time multiplex switch (TMS) unit 117.

TMS 117 is a two-stage switch array comprised of solid state crosspoints which provide a multiplicity of unidirectional paths between its input and output. Each network connection through TMS 117 is made in terms of a pair of unidirectional paths in one of the 128 time slots sharing the paths on a repeating basis at an 8 KHz rate. The switches are controlled by information contained in time slot memories and this information is placed in the memory by the processor under the control of call processing programs.

The TSI units 113–116 provide the initial time-space and final space-time stages of the network 107. The time slot interchanger receives incoming pulse code modulated samples over analog and digital facilities in a DS-120 format where 120, 8-bit PCM channels are multiplexed with 8 maintenance channels to form a 128 time slot frame. The receiving portion of the time slot interchanger buffers the incoming links to allow synchronization of the data with the network timing and performs the initial time-space switching before transmitting data to the TMS. After passing through the TMS, the data is returned to the same TSI or another TSI where the final space-to-time conversion is performed. The TSI then reloads the data onto outgoing DS-120 links where it is transmitted to the appropriate analog or digital facility.

Access to the switching network 107 is via serial pulse code modulation links each accommodating 120 voice channels. However, central offices 103 and 104 can be connected to toll switching system 102 via analog or digital transmission facilities. Thus, as seen in FIG. 1, local central office 104 is connected to the toll office over the digital facilities which terminate in digroup terminal unit 110, while local office 103 is connected via analog trunks to voice interface unit 109. Digroup terminal 110 performs the multiplexing and demultiplexing between the interoffice transmission facilities and network 107 and also processes signaling information via signal processor 112.

The analog trunks are terminated in a voice interface unit such as 109 whose principal function is analog-to-digital conversion (and vice-versa) plus formatting digital data for the TSI units. Voice interface unit 109 communicates with the central control via signal processor 111.

Signal processor 111 is a directed processor under the control of central control 118 and provides the scan, distribute and digit reception tasks for analog trunks. Signal processor 112 performs the equivalent tasks for the digital trunks except that instead of physical scan and distribution points, the supervisory states of each trunk are stored in a memory in a signal processor.

The majority of the logic, control, storage and translation functions required for the operation of the toll switching system are performed by central processor 108. Central processor 108 is a data processing facility and can functionally be divided into a central control 118, program store 119, call store 120, file store 121 and other apparatus that has not been shown to simplify the drawing. A typical processor suitable for use in the illustrative toll switching system is described in the *Bell System Technical Journal*, Vol. 56, No. 2, February 1977.

The program store 119 contains programs that are normally resident in the system while call store 120 contains transient data relating to calls in progress. File store 121 is a source of office data and programs, and store 121 will retain the data in the event of a power or hardware failure. The file store is also used to replenish program stores that become faulty and lose their data.

Central control 118 is the information processing unit of the system and executes the program instructions resident in program store 119 using the call processing data in call store 120. Central control 118 communicates with the peripheral units via bus 122.

As mentioned above, interoffice signaling information is extracted from the transmission paths of analog and digital trunks by signal processors 111 and 112, respectively, and used by central control 118 for call processing. However, the signaling for certain trunks may be transmitted between the offices over a common data link separate from the transmission paths using a common channel interoffice signaling system. A description of a typical common channel interoffice signaling system is disclosed in the *Bell System Technical Journal*, Vol. 57, No. 2, dated February 1978, and is represented herein by CCIS blocks 123 and 126 and data link 132.

Coupled to the toll switching system is the network services complex 100 comprising NSC processor 101, CCIS terminal 126, DS-1 interface 129, time slot interchange 124, input/output control 130 and data store 125. Network services complex 100 can also include other units such as an audio conferencing facility designated herein by block 128.

It is intended that network services complex 100 function with many different types of switching systems to provide several special services in addition to those mentioned above. As such, complex 100 has been designed to connect to a switching system via conventional interoffice trunks 131 and a CCIS data link 132. The interoffice trunks 131 serving complex 100 are digital facilities similar to the trunks between toll office 102 and local office 103 as described above and the data link 132 and its CCIS terminals are similar to those described in the 1978 *Bell System Technical Journal* cited above.

The network services complex is modularly designed to allow for various service units to be added. All units are interconnected over a data bus 133 and a control bus 134. The control bus is used by the NSC processor 101 to communicate control, status and error information with the various units in the complex. Data bus 133 consists of a transmit bus and a receive bus and each bus is a 256 time slot time-multiplexed PCM data bus.

Interface 129 connects the T1 lines from toll switching system 102 to time slot interchange unit 124 which switches any time slot in the receive T1 bus or the transmit portion of data bus 133 with any time slot on the T1 transmit bus or the receive portion of data bus 133.

The network services complex 100 is controlled by NSC processor 101 which performs or initiates all call processing, maintenance, fault recovery, diagnostics and audits for the entire complex. Processor 101 also interfaces with CCIS terminal 126 to transmit and receive messages from the host toll switching system 102.

As mentioned above, the network services complex can be equipped to furnish many services. For purposes of illustration, let it be assumed that the complex is equipped with a conference facility designated by block 128 and the conference facility will be used for establishing audio conferences under customer control.

Accordingly, data store 125 is provided to furnish announcements over the telephone network to instruct customers in the use of special facilities such as conference calling. In general, data store 125 receives requests for announcements in the form of orders from NSC processor 101 over control bus 134. The nature of these orders and the functions of the conference facilities will not be described herein since a detailed knowledge of this is unnecessary for a full understanding of the present invention.

Figure 2:
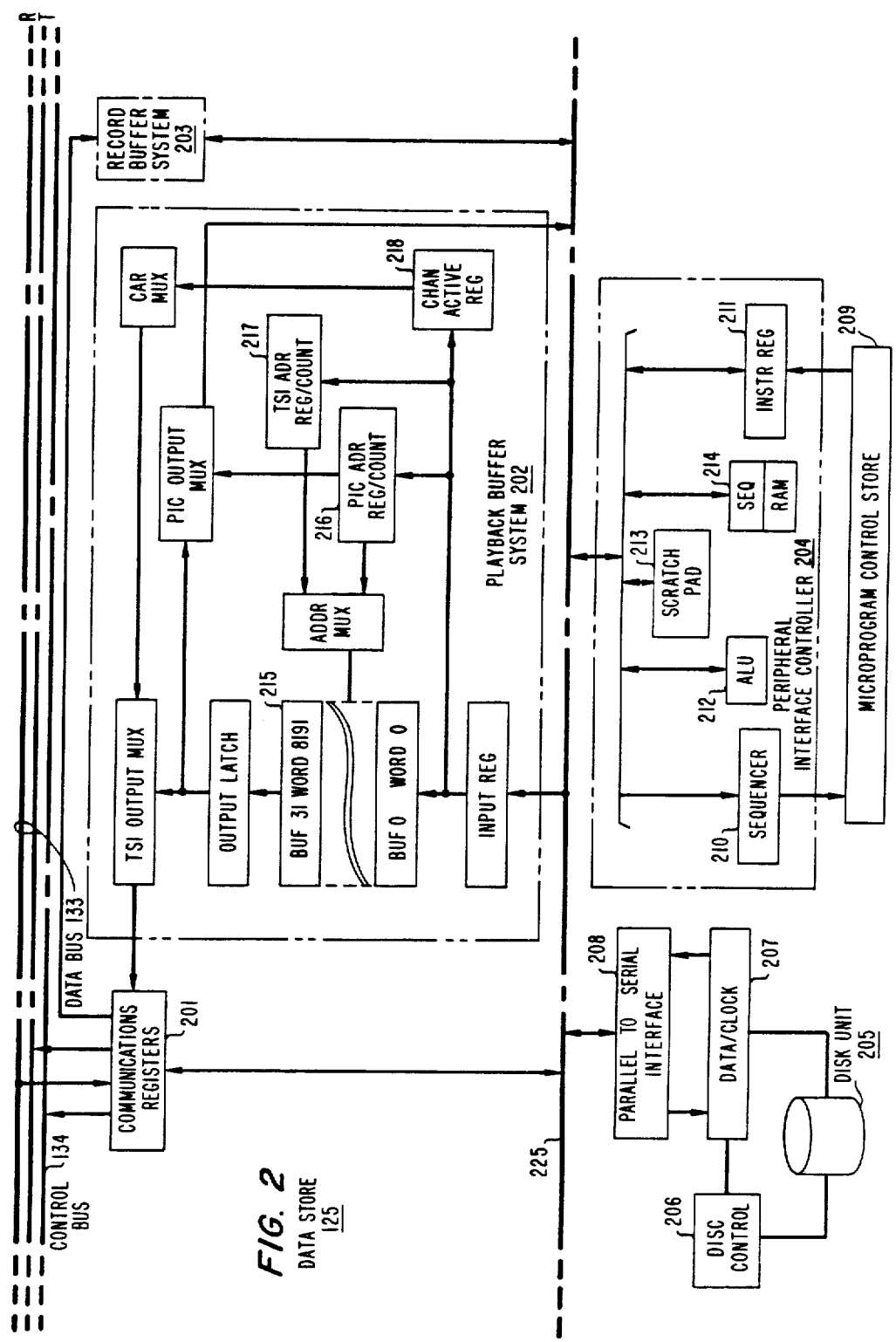
FIG. 2 shows a more detailed block diagram of the data store used for providing the announcements.

The apparatus of data store 125, which will now be described, is more fully disclosed in FIG. 2. As shown in FIG. 2, data store 125 is a processor controlled facility comprising a plurality of communications registers 201, playback and record buffer systems 202 and 203, peripheral interface controller 204 and disc unit 205 with its associated control, data/clock and parallel/serial interface units 206-208. Audio information transmitted from time slot interchanger 124 (shown in FIG. 1) via 8-bit serial/parallel multiplexed bus 133R is received in record buffer system 203 in encoded PCM format. Similarly, audio information is played back via playback buffer system 202 and transmit bus 133T to time slot interchanger 124. Data transfer occurs at a 64 Kb/s rate per channel.

Orders received from NSC processor 101 and replies generated by peripheral interface controller 204 are transmitted over control bus 134 at a 2 Mb/s rate.

Orders for the playing back of various messages which are stored in disc unit 205 are executed by reading from sectors of the disc 205 into a plurality of the playback buffers of the playback buffer system. In this embodiment, each playback buffer can contain up to two seconds of information for each playback channel and the data store as a whole can accommodate up to 32 channels of play back, with seven of these allocated to playing repetitively a two-second announcement such as a tone. The 32nd channel is used for internal maintenance.

Each playback channel of the data store will be assigned a time slot on bus 133T and, of course, a plurality of data stores, such as 125, can be added to the bus to increase the overall voice storage and playback channel capacity of the network services complex. Most of the intelligent logic for the data store resides in the peripheral interface controller 204. Controller 204 is a high-speed sequencer-driven controller which performs all common arithmetic and logic functions for control purposes within the data store. Controller 204 is driven by a firmware program contained in the microprocessor control store 209. Controller 204 communicates with other equipment in the data store such as communication registers 201, buffer systems 202 and 203 and the disc unit via internal bus 225.

Periodically, sequencer 210 in controller 204 generates an address to read a word from store 209. This word is read into instruction register 211 in the controller which executes the instruction. Controller 204 also contains interrupt control logic, a scratchpad register 213 and a random access memory 214.

Announcement storage is provided by moving head disc unit 205. In this illustrative embodiment, the disc unit contains ten platters each having two faces. Nineteen of the faces are used for voice storage and one contains clock information. Each disc face is divided into annular tracks of which 332 are used for message storage and 32 are used for data storage. The tracks are divided into 32 sectors and each sector holds 512 bytes of data. The information stored in all sectors of one track is equivalent to two seconds of recorded material. The annular tracks of all nineteen voice storage faces are aligned one above the other and when taken together form a cylinder.

Of the cylinders dedicated to voice storage, the outermost cylinders including track 0-13 are reserved for half-second phrases which are repeated four times in each track while the adjacent cylinders including tracks 14-332 contain two one-second phrases per track. Innermost and adjacent to the voice storage cylinders are cylinders for storing data, such as, billing information, RAM based firmware backup, etc.

Returning now to FIG. 2, it can be seen that the communications registers 201 are provided to interface peripheral interface controller 204 with the control bus 134, and hence, the other units including NSC processor 101 of the network services complex 100. Communications registers 201 included error source registers that can be directly read from and written into by processor 101 so that processor 101 can be apprised of the condition of the peripheral units on the bus. A status register is also provided and the status register can be directly read from peripheral interface controller 204 or read and written from processor 101. Communications registers 201 also includes an input register and an output register for moving orders between peripheral interface controller 204 and the network services complex processor 101, and apparatus is also provided to perform error checking on all data moved on the control bus 134 and the transmit and receive buses 133T and 133R.

The playback buffer system 202 performs the basic function of processing various data going from parallel/serial disc interface 208 to the time slot interchanger 124 of the network services complex. Serial data on the disc is read from the unit 205 and converted to parallel format and stored in a RAM buffer in interface 208. This parallel data is then transferred on a word-by-word basis to the dynamic RAM 215 in playback buffer system 202 under control of the peripheral interface controller 204. Each word consists of two bytes of data plus a parity bit for each byte. The playback buffer system stores data for a particular playback channel in a playback buffer in RAM 215 on an interleaved basis with 31 other playback buffers each of which is associated with a corresponding playback channel. Only 24 channels will be used, however, for playback in this embodiment.

Peripheral interface controller 204 uses address register 216 to write and read from RAM 215. Consecutive reads and writes by controller 204 are done internally to the playback buffer system 202 by accessing the memory on an interleaved basis with the next memory location being 32 locations higher in memory.

Information is read out of RAM 215 over the transmit bus 133T under control of TSI address register/counter 217. This register follows the time slot count and can be read from but not written into by controller 204. In normal operation, peripheral interface controller 204 would "0" register 217 at startup. After startup, register 217 would automatically increment through the entire memory in consecutive order to read a word of data for each playback channel for every frame.

Channel activity register 218 shown in FIG. 2 is used to designate those channels that are active and those channels over which an idle code is to be transmitted.

The record buffer system 203 provides one method for writing voice data onto the disc. In addition, the RAM in the record buffer system serves as the primary memory store, holding the announcement mapping of the disc, link lists, etc.

During the recording procedure, PCM voice data over a T1 channel is routed over a specified time slot on receive bus 133R to the RAM in record buffer system 203. Peripheral interface controller 204 accesses the record buffer system on a time shared basis with TSI 124.

For each separate announcement to be recorded, an order will be sent over control bus 134 from NSC processor 101 to peripheral interface controller 204 that an announcement of n seconds is being sent over receive bus 133R in the time slot designated for the record channel.

In accordance with a feature of the invention, the data store advantageously has been designed to operate on a base cycle of approximately one second. That is to say, the regular work of playback and recording for 24 active channels plus two periods for mandatory data jobs should be accomplished within each one-second base cycle interval. Thus, no channel is ever more than one second away from the beginning of an announcement, and the average waiting time will be even less as seen from the following description.

The mandatory data jobs referred to above are those jobs that must be done, such as, recording the details of calls, call billing, etc. Under normal operation, it is not expected that all 24 channels will be busy simultaneously; therefore, during the one-second base cycle, other jobs, such as maintenance, can be performed.

In carrying out the functions of storing and playing back announcements, peripheral interface controller 204 maintains a plurality of tables in memory. These tables will be referred to in describing the operation of the system and a brief description of some of the more pertinent tables will be given now.

The PLAYBACK INPUT QUEUE is a table for holding all new orders for the playback of announcements that are received from NSC processor 101. The table contains the announcement number and an indication of whether it is a half-second or one-second announcement. In this illustrative embodiment, 32 locations are assigned in this table for each of the 24 playback buffers.

The THREAD table holds the announcement numbers for all announcements to be played for one playback buffer. There are 32 words per buffer in the THREAD table in this embodiment, and each word contains the announcement number and an indication of whether it is a half-second or one-second announcement plus various status flags.

There are two FORWARD tables. One is for half-second announcements, and the other for one-second announcements. Each pair of words in the FORWARD table holds the address of the disc segment to be read and the address of the playback buffer to receive the data.

A BACKWARD table is also provided. The BACKWARD table is similar to the ONE SECOND FORWARD table except that it is ordered in the reverse direction.

Peripheral interface controller 204 also maintains a BUFFER STATUS table to indicate the status of each playback buffer. Each buffer can assume one of four states, namely: idle, playback, last buffer fill and final second of playback. A better appreciation of the invention can be had by a description of the operation of the data store.

Figure 3:
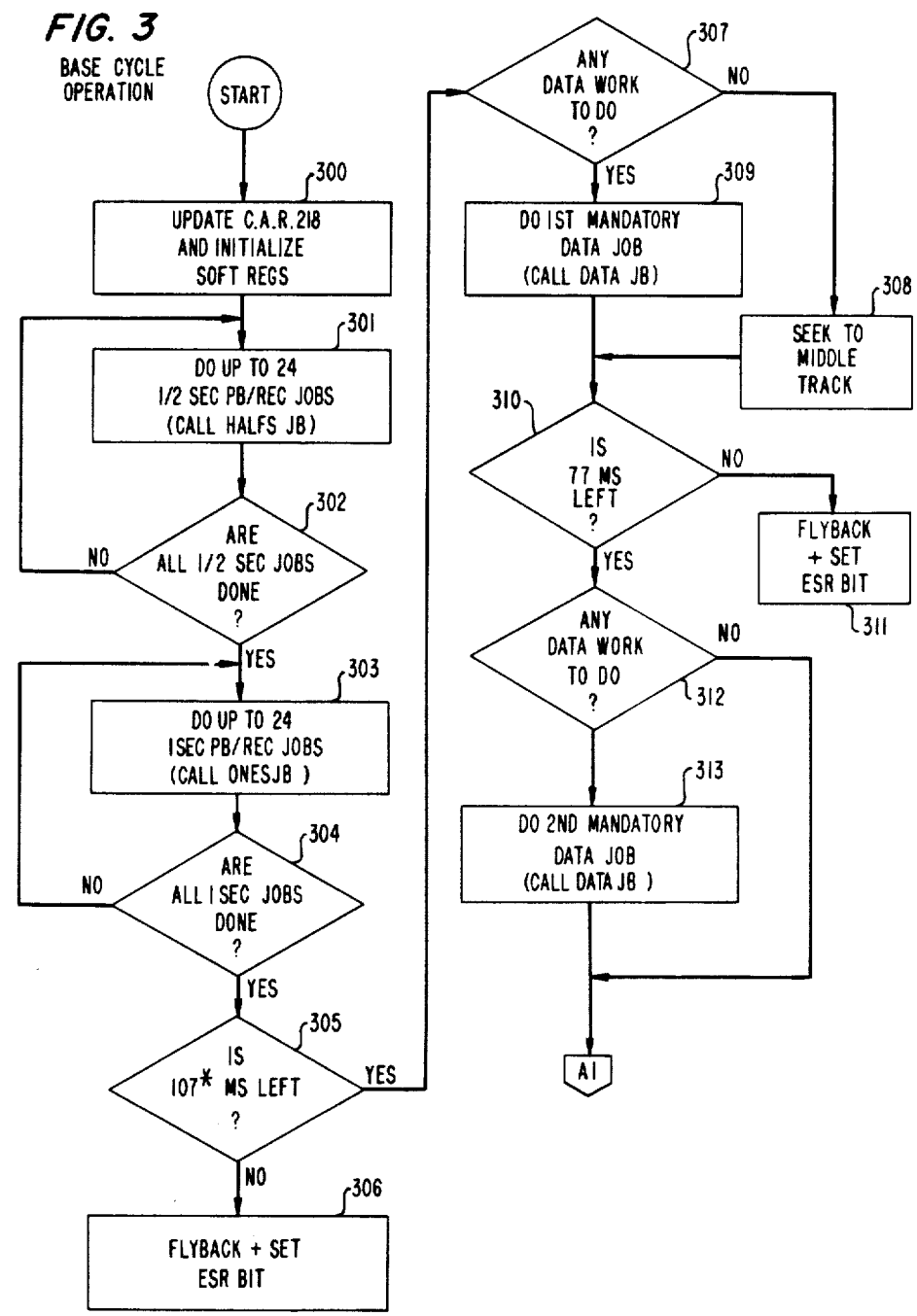
FIGS. 3–5 depict a flow diagram of a program called BASE CYCLE which describes the main sequence operations of the data store.
Figure 4:
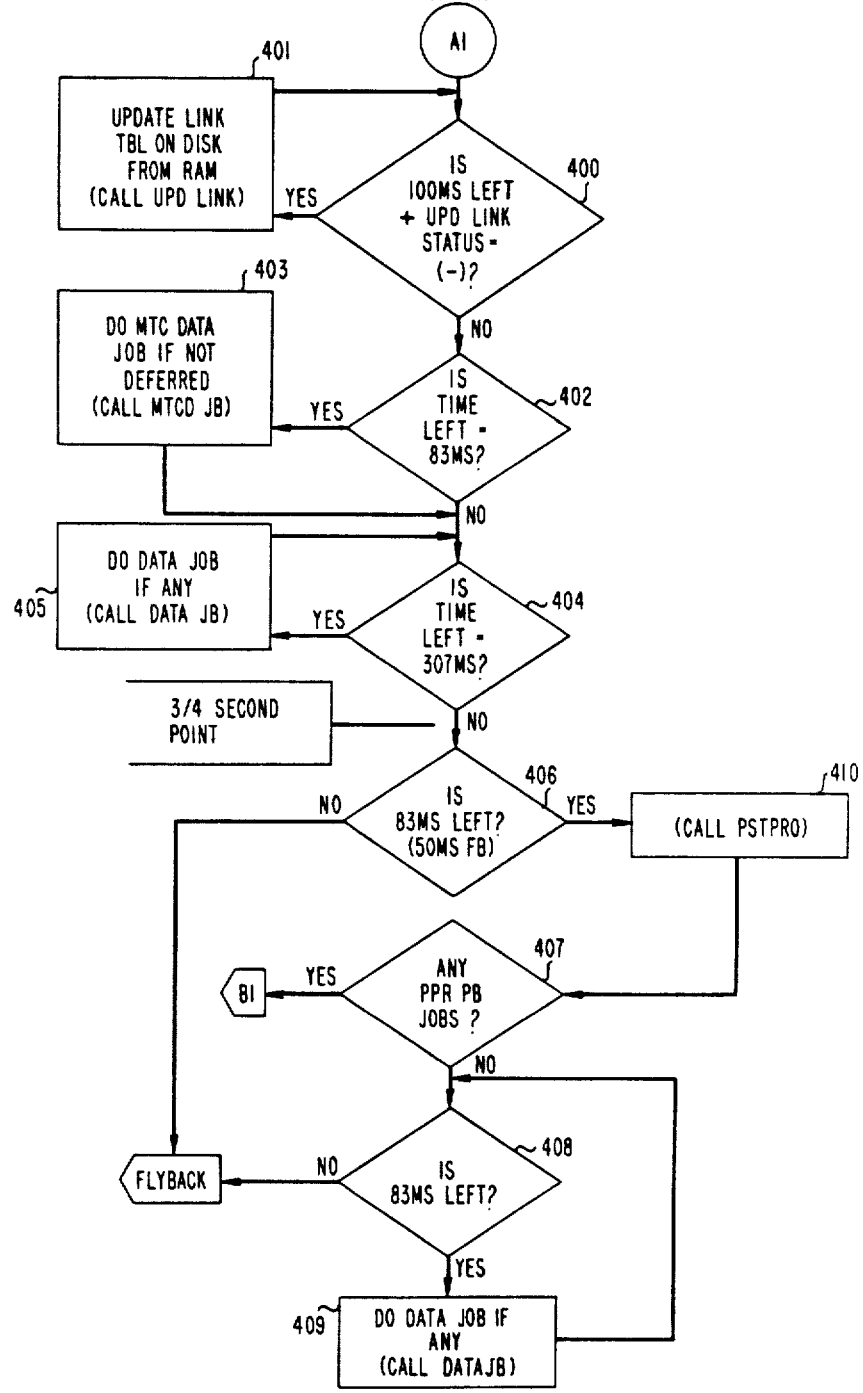
Figure 5:
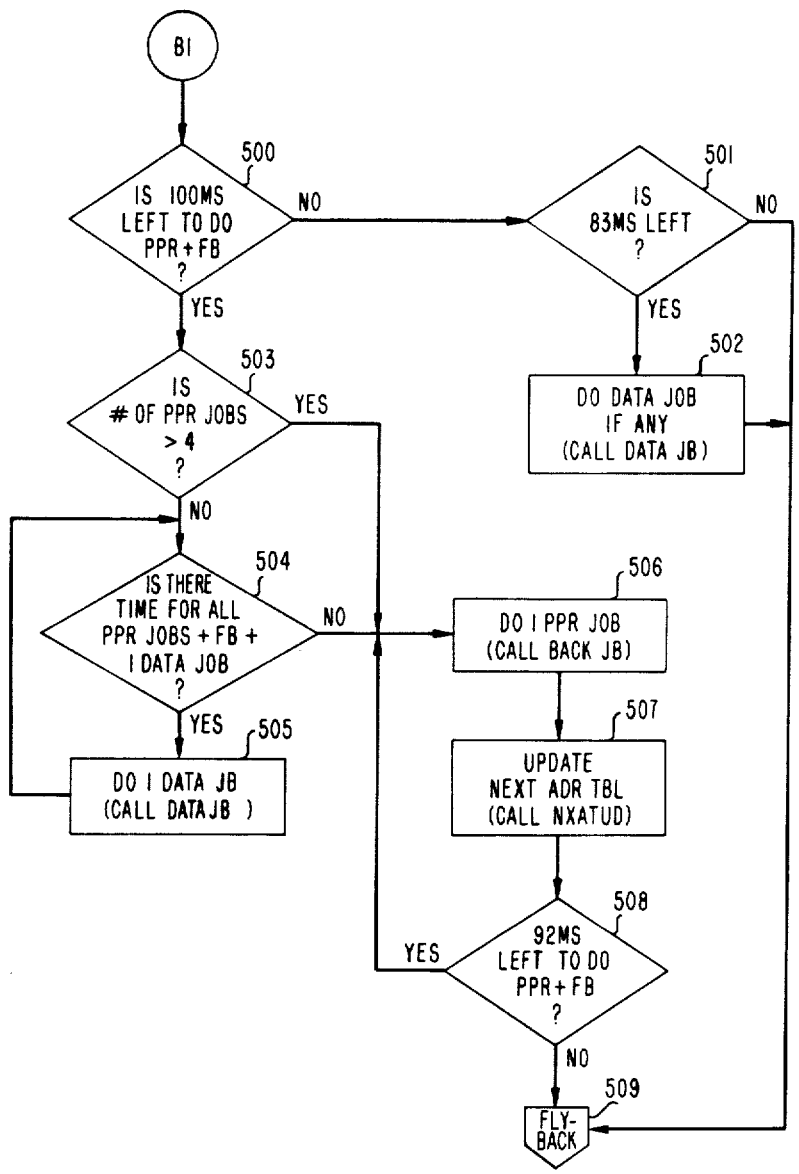

A flow chart of the base cycle operation is shown in FIGS. 3-5. This operation is responsible for the overall scheduling of all the normal operating tasks of the data storage unit. The major tasks are to do the playing back and recording of announcements, the writing and reading of data in the disc data storage areas, handling the input/output orders on communication bus 134, and executing orders received from NSC processor 101.

As mentioned above, the base cycle operation is performed in approximately one second and the timing of this comes from a hardware counter. During this interval, a one-second segment of audio must be placed in the playback buffer of each channel. Since the buffer holds two seconds of audio, half of the buffer is being filled while the other half is being played out. For half-second announcements, two half-second segments must be placed in the buffer during each base cycle.

When a playback request is received from NSC processor 101, a buffer is filled with one second of audio during one cycle. In the next base cycle, the bit associated with that buffer is set in the channel activity register 218 which allows playback to begin.

After the playback/record work of one cycle is done, two mandatory data jobs must be done if any mandatory data jobs have been requested. If time permits, the data jobs are done up to the 750 ms point of the base cycle after the reading heads have moved in a forward direction from the outer cylinder 0 to the inner cylinders. After that point in the cycle, any new requests for playback take priority to minimize the time that the customer must wait to hear an announcement. The operation that takes place after the mandatory data jobs will be referred to herein as "post processing" and the new playback jobs will be sorted to be processed as the heads move back to cylinder 0. Before post processing jobs are begun, the processor determines if all these jobs can be done and if the processor still has time to do some data jobs. This must be determined because the data is located at the center of the discs and it would be inefficient to move the heads all the way to the periphery while doing playback work and then return to the center of the disc to do data work followed by a flyback operation where the heads are moved to the outside cylinder to start the beginning of the next cycle.

The base cycle operation begins as shown in FIG. 3 by starting new playback and stopping completed playbacks. This is accomplished by peripheral interface controller 204 updating the hardware channel activity register 218 from information stored in memory as shown in Box 300. Also, certain other software registers are initialized in RAM 215 to set the time in which the base cycle operation must be completed. The playback/record jobs begin by setting a job counter so that no more than 24 jobs (half-second job pairs and one-second jobs combined) are done. Half-second jobs are done first since the audio information to be played back resides in the lower numbered cylinders. A half-second job is done by calling a routine named HALFSJB as shown in box 301. This subroutine takes a job from the appropriate table, such as the HALF-SECOND FORWARD table, and sets the disc up with the reading head on the proper cylinder and face, and finding the right sector therein. A subroutine is then called to actually read from or write-in the selected sector of the disc. When the half-second job is done, a return is made to the base cycle operation and the job counter is decremented (box 302).

When all half-second jobs are done (not to exceed 24 jobs), a subroutine named ONESJB is called. This routine is similar to HALFSJB except the ONE SECOND FORWARD table contains the list of work to be done. This operation is performed by the processor performing the operation shown in boxes 303 and 304. When all half-second and one-second work is completed, peripheral interface controller 204 checks the software timer to see how much time is left in the base cycle as shown in box 305. If not enough time is left to do a data job, an error bit is set and the heads are reset to cylinder 0 by executing the FLYBACK subroutine shown in FIG. 12.

In the illustrative embodiment of the invention, 107 ms are needed to do two of the worst case. This amount of time is needed to seek to the correct data area, find the desired sector on the disc, read the sector and then cause the heads to fly back to cylinder 0. If at least 107 ms are left, a mandatory data job is performed by executing the operations described in boxes 307 and 309 and by calling subroutine DATAJB. When no data jobs are scheduled, the reading heads seek to the middle of the data area and the peripheral interface controller 204 transfers to a task dispenser subroutine.

After the first mandatory data job, time is once again checked to ascertain if at least 77 ms are left in the base cycle to do another data job. If sufficient time is available, subroutine DATAJB is once again called and the second mandatory data job is executed. After the second mandatory data job is done, the time is once again checked as shown in box 400 to ascertain if a record sequence is underway which is requesting that the LINK table be updated to reflect the new recording. If there is sufficient time, this task is performed as shown in box 401 and the processor checks the remaining time in the base cycle to ascertain if any deferrable maintenance tasks can be done. When sufficient time is available as indicated by execution of the YES branch of decision box 402, the processor will perform whatever maintenance tasks are scheduled in accordance with the operation described in box 403.

The processor now checks to see if there are at least 307 ms left in the base cycle. If so, DATAJB is called to do additional data jobs until less than 307 ms remains in the base cycle. Finding less than 307 ms, approximates the ¾ second point in the one-second base cycle and is a point that has been chosen for the processor to determine if any new requests for playback have been received during the prior processing.

Up to this point in the base cycle operation, the reading heads have been moving in a straight line from the outer cylinders to the inner cylinders playing the messages recorded therein via the playback buffer. These messages, it will be recalled, were presorted for playback in the proper order during the flyback operation of the prior one-second base cycle. After all playbacks have been performed, data jobs in the inner cylinders of the disc are executed by randomly seeking over the tracks in the data area of the disc.

If any new requests for playback have been received during the initial 750 ms of this base cycle period, they will be sorted and scheduled for playback as the reading heads are moved back on the return trip to cylinder 0. The sorting of these playback orders to be executed as the heads return to cylinder 0 will be referred to herein as post-processing work and will be described subsequently with respect to FIG. 11.

Peripheral interface controller 204, after executing the post-processing subroutine (PSTPRO), returns to the base cycle of operation as shown in box 410. If there are no post-processing jobs to do as determined by the processor executing box 407, additional data jobs will be done until less than 83 ms are left in the base cycle at which time the reading heads will be sent back to the outer cylinder 0. This process is described in boxes 408 and 409. If there are post-processing jobs to do, a check must be made to ascertain if there is enough time to handle at least one playback request and still allow sufficient time for the heads to fly back to cylinder 0. The processor ascertains this by executing decision boxes 500 and 501. More specifically, if less than 100 ms and at least 83 ms are left in this embodiment, a data job can be done before returning the reading heads to cylinder 0. However, if less than 83 ms are left, the heads must be returned to cylinder 0 at this time.

If at least 100 ms are left to do the playback work sorted by post-processing and return the heads to cylinder 0 during the flyback operation, a check is made of the number of post-processing playback jobs that must be done by executing box 503. When the number of jobs is four or less, peripheral interface controller 204 determines if there is sufficient time to do all post-processing playbacks plus one data job by executing box 504. If there is sufficient time, the data job is done first and data jobs are continually done until there is still enough time left to complete all post-processing playback work as shown in boxes 504 and 505.

The post-processing playback jobs, i.e., playing back of messages as the reading heads are traversing the disc back to cylinder 0, are continuously performed by peripheral interface controller 204 executing box 506 which calls a subroutine named BACKJB. When subroutine BACKJB is executed, a job is taken from the BACKWARD table and the reading heads of the disc are set to the disc segment to be read according to the cylinder, face, and sector identities stored in the table. The BACKJB subroutine also calls another subroutine which causes the segment to actually be read and a return is made to the BASE CYCLE program. The BACKJB subroutine is effective to update the BACKWARD table and NEXT ADDRESS table pointers and the NEXT ADDRESS table and a return is made to the BASE CYCLE. The loop including boxes 506–508 is executed continually until less than 92 ms are left. At this point, the operation described in box 509 is performed to begin the fly-back operation.

The fly-back period is when the heads are being sent back to cylinder 0 in preparation for playing back messages during the next one-second base cycle. A fly-back period of 39 ms has been allowed in this illustrative embodiment and during this period, controller 204 will do preprocessing work which will sort the latest requests for playback along with playback orders that were not completed as the heads were returning to cylinder 0 so that these requests can be satisfied during the next base cycle of operation.

Figure 6:
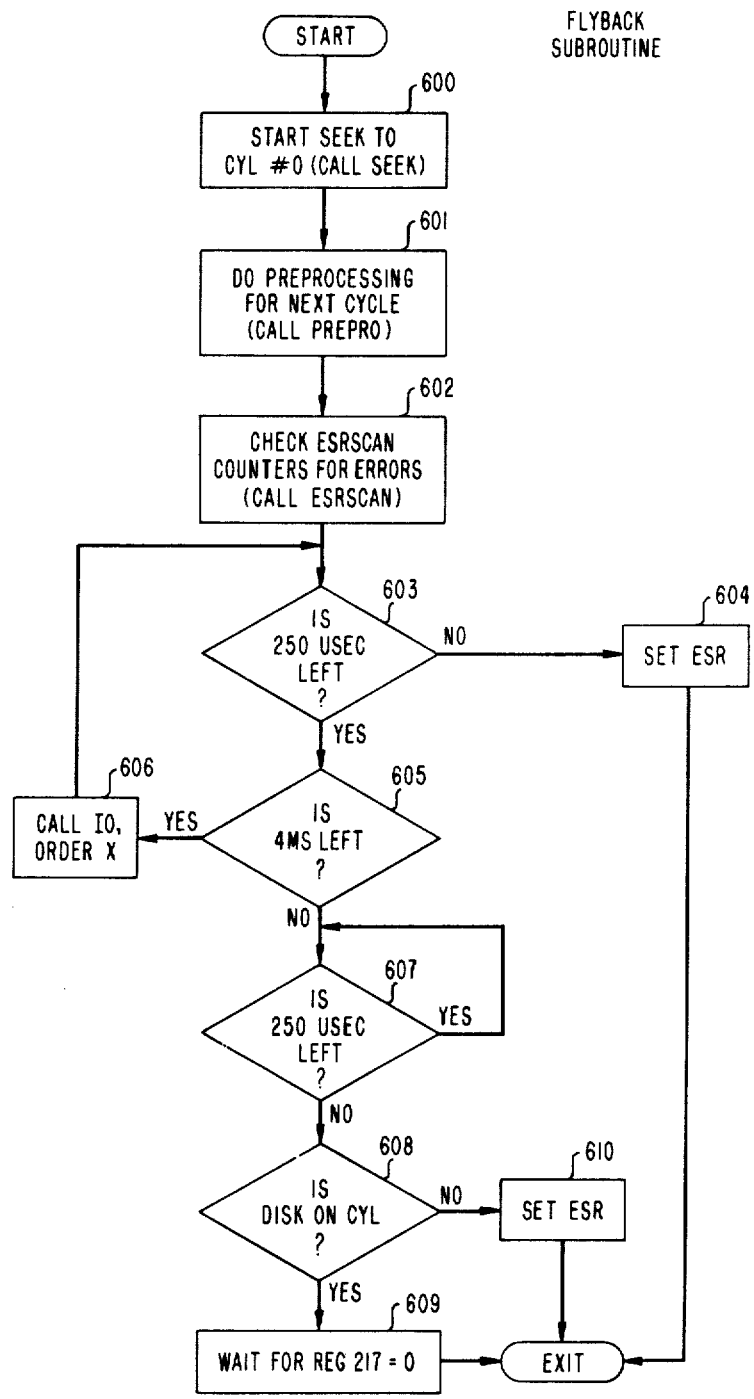
FIG. 6 shows a subroutine FLYBACK which illustrates the sequence of operations for returning the reading heads of the disc memory to their starting position.
Figure 7:
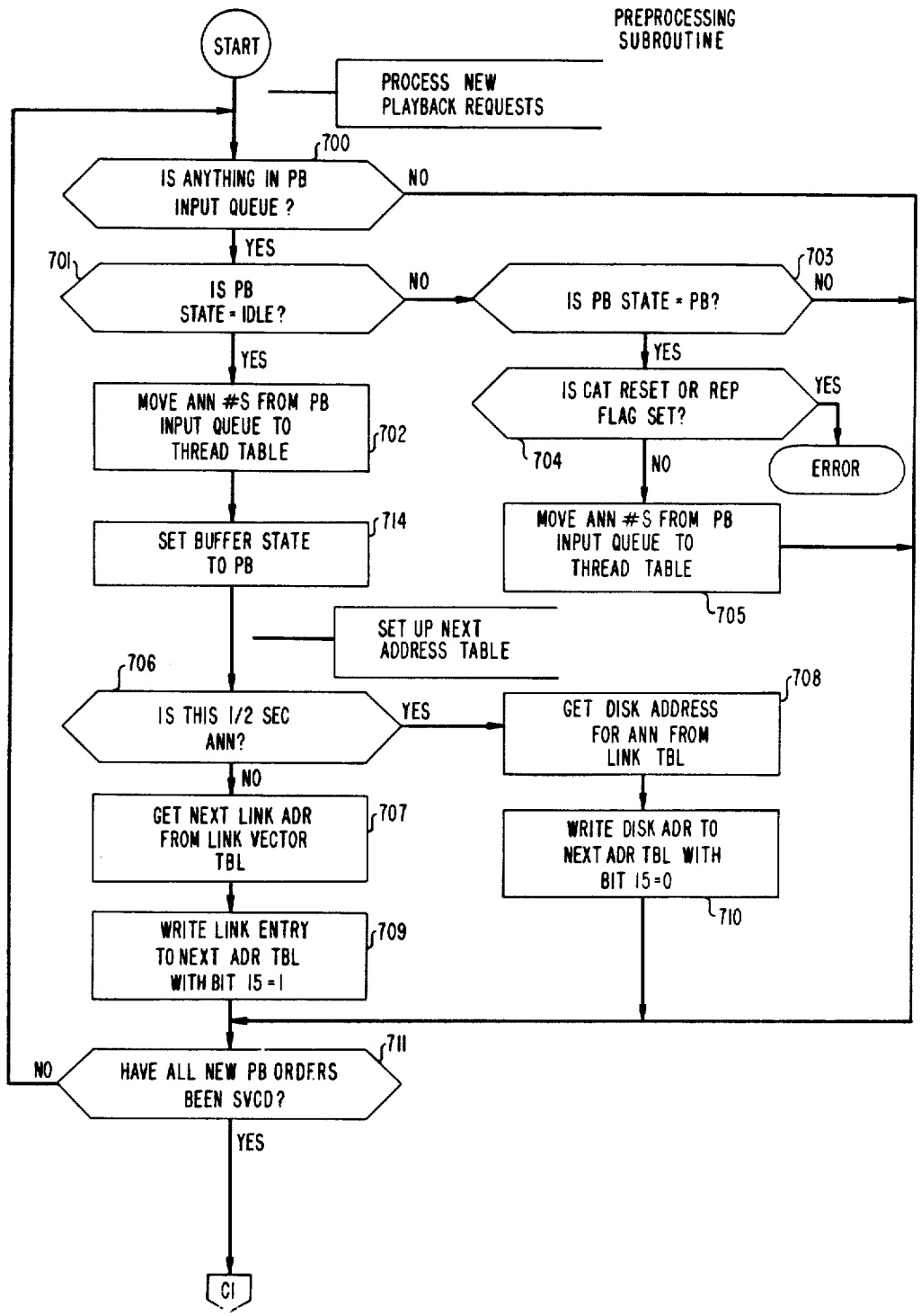
FIGS. 7–10 show the PREPROCESSING subroutine which describes a sequence of events necessary to cause the playback of a plurality of stored announcements at the beginning of the base cycle of the operation.

The fly-back operations are set forth in the flow chart of FIG. 6 and the first task is to call a subroutine named SEEK. This subroutine is initiated by placing the desired cylinder number (0 in this case) in a register causing the reading heads in disc unit 205 to move to that cylinder. As a result of executing box 601, controller 204 calls the preprocessing subroutine called PREPRO to process new requests for playback and set up one segment of new or ongoing audio messages for each buffer into the HALF and ONE SECOND FORWARD tables. These tables are sorted by the PREPRO and SORT subroutines, which will be described later, to achieve a straight line seek of the reading heads as they move toward the center of the discs.

After executing the preprocessing subroutine PREPRO, a return to the fly-back operation shown in FIG. 6 causes the peripheral interface controller 204 to do input and output order execution until 4 ms are left (See boxes 603-606). From the 4 ms point to the end of the cycle, the processor will ascertain if the heads are on cylinder 0 and then wait until the time slot interchange register/counter 217 reads 0 indicating that a full-time frame has been read out and the system is ready for the next frame. When this occurs, the processor is once again ready to begin processing requests from the beginning of the base cycle.

The preprocessing subroutine PREPRO is executed prior to the beginning of each one-second base cycle period. Data is moved from the PLAYBACK INPUT QUEUE into the THREAD table. The THREAD table holds up to 32 announcement numbers for buffers 0-23 and two announcement numbers for buffers 24-31. Buffers 24-30 are only filled when the data store is out-of-service. While in service, the audio data in buffers 24-30 is played out autonomously by the hardware repeatedly. Buffer 31 is used for maintenance purposes. The NEXT ADDRESS table is updated with the appropriate data depending on the entries in the THREAD table and the BUFFER STATUS table and disc data entries are placed in temporary HALF SECOND and ONE SECOND tables.

These temporary tables are sorted and then placed in the actual RAM table assignments for use by other routines that will be executed during the one-second base cycle. The processing of record work is done before the FORWARD tables are sorted so that record work can be done during playback jobs.

The preprocessing subroutine PREPRO is shown in FIGS. 7-10. When the routine is entered, the PLAYBACK INPUT QUEUE is examined to ascertain if there are any new requests for playback. The PLAYBACK INPUT QUEUE holds a 15 bit announcement number plus a flag for indicating half-second announcements. Thirty-two word locations are assigned for each of the 24 playback buffers.

The status of the playback buffer is checked and if the playback buffer is already in a playback state, controller 204 assures that the concatenation flag is set or repeat flag is reset by executing decision box 704 and then moves the announcement number to the THREAD table.

If the playback buffer had been idle, the announcement number is moved to an empty THREAD table and the playback buffer state is changed as shown in boxes 702 and 714. A decision (box 706) is now made to determine if the new request is for a half-second announcement or a one-second announcement. If the announcement is a one-second announcement, the next link address is obtained from the LINK VECTOR table and written into the NEXT ADDRESS table. If, however, the order is for a half-second announcement, the peripheral interface controller 204 gets the disc address from the LINK table and writes the disc address into the NEXT ADDRESS table. Peripheral interface controller 204 loops through this sequence of operations until all new playback orders have been serviced as indicated by the execution of the YES branch of box 711. At this point, the NEXT ADDRESS table will contain the new work just entered and work that had been set up during the previous base cycle.

After all new orders have been processed, the balance of preprocessing subroutine is executed to combine the new work and the ongoing work to set up the temporary FORWARD tables in the RAM of controller 204. It will be recalled that the FORWARD tables contain the addresses of the disc segments to be placed in the playback buffers during the next one-second base cycle interval.

Peripheral interface controller 204 now examines the BUFFER STATUS table to ascertain the status of the first active playback buffer as described by boxes 800-803. When the various buffers are checked, those that are found to be in the final second of playback are reset to an idle state (box 804). If a buffer state indicates that playback buffer has been filled for the last time, peripheral interface controller 204 must report this status back to NSC processor 101 as described in boxes 805 and 806 and set the buffer to a final playback state.

If the buffer indicates it is already in an active state, the half-second flag is examined in the associated NEXT ADDRESS table, and the action to be taken depends on whether the next message sequence is a half-second segment or a one-second segment. If the half-second flag is not set, controller 204 executes boxes 808 and 809 to load the ONE SECOND FORWARD table. A one is now added to the NEXT ADDRESS table output (box 810) to get the next link to the LINK table and the next link is then moved to the NEXT ADDRESS table. If the END flag is found in a set condition when decision box 900 is executed, a link audit is now made to assure that the last link points to the start of the LINK table. This audit can be run by obtaining the announcement number from the THREAD table and accessing the associated LINK VECTOR table as shown in boxes 901-903. If the audit is okay, the next segment to be loaded in a buffer must be determined. This is done by incrementing the THREAD table pointer (box 906) and checking to see if the table is empty. Upon finding an empty table, the buffer state is set indicating that the buffer has been filled with the last message segment of an announcement. If the link audit fails, an error bit would be set as indicated by box 904.

When peripheral interface controller 204 executed decision box 907, if the THREAD table was not empty, the NEXT ADDRESS table is set up to either the disc address for a half-second audio segment or the next link address for the next one-second audio segment.

Figure 10:
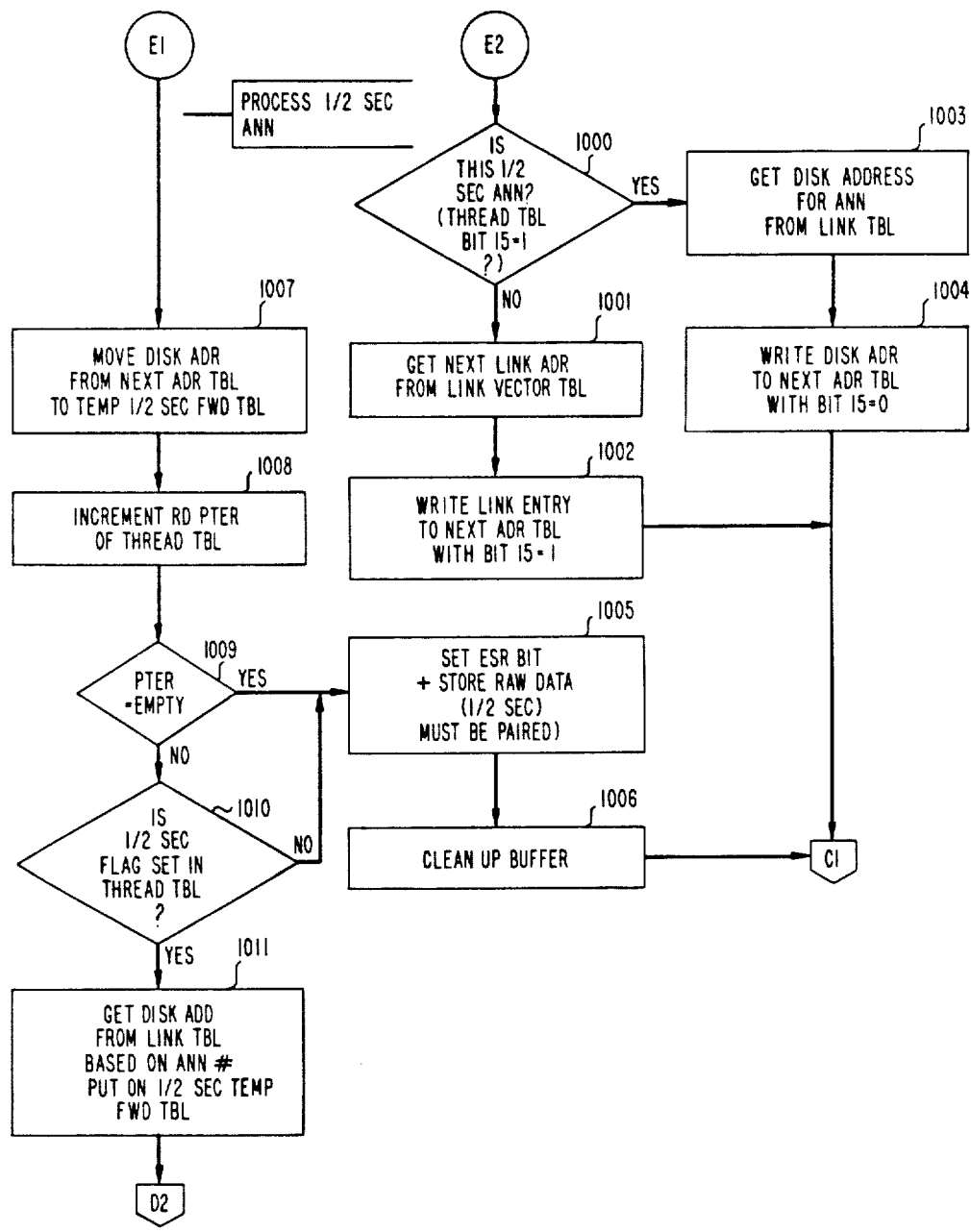

Half-second segments are processed in a similar manner as shown in boxes 1007-1011 of FIG. 10 and need not be described herein for a full understanding of the invention.

Figure 8:
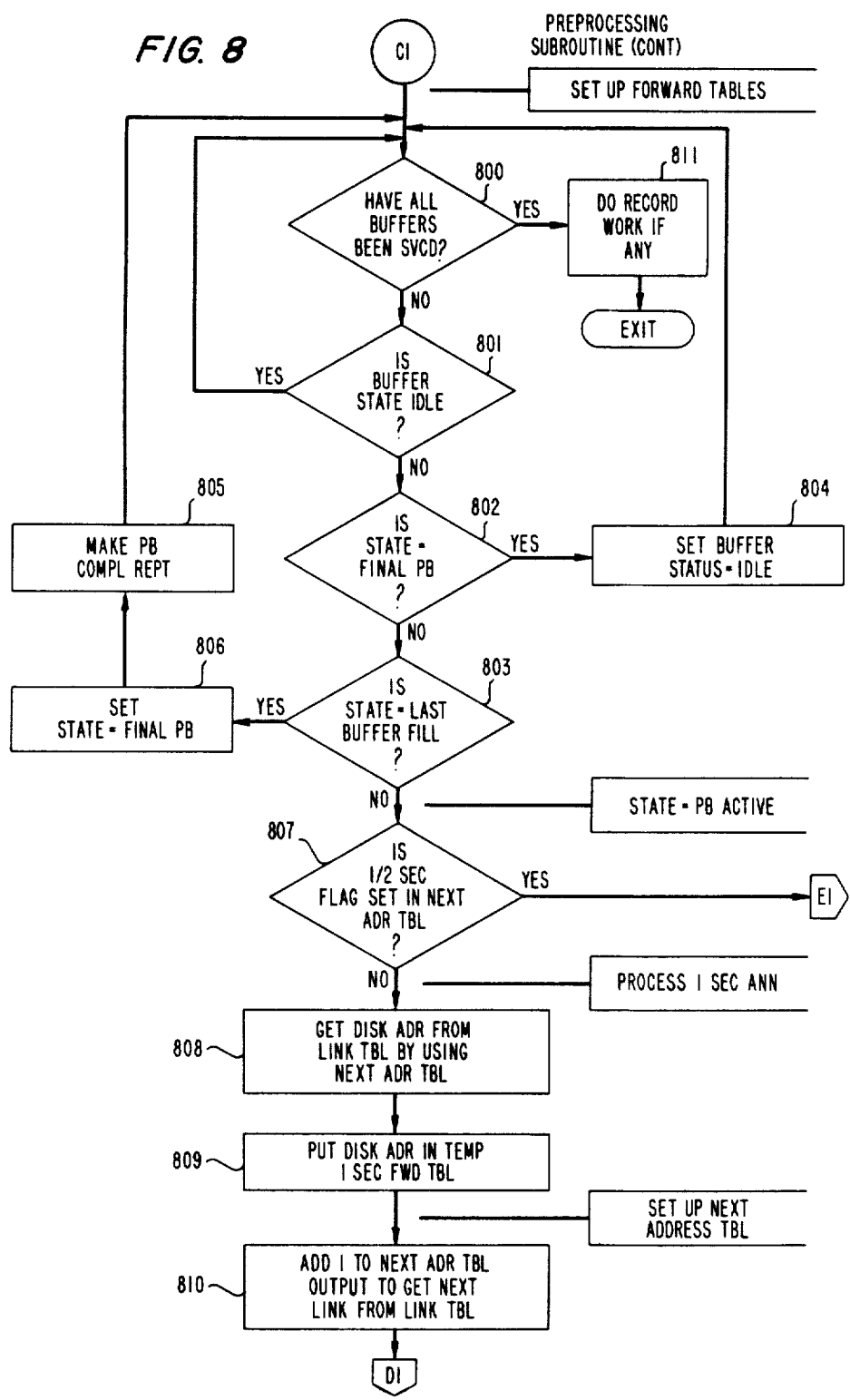
Figure 9:
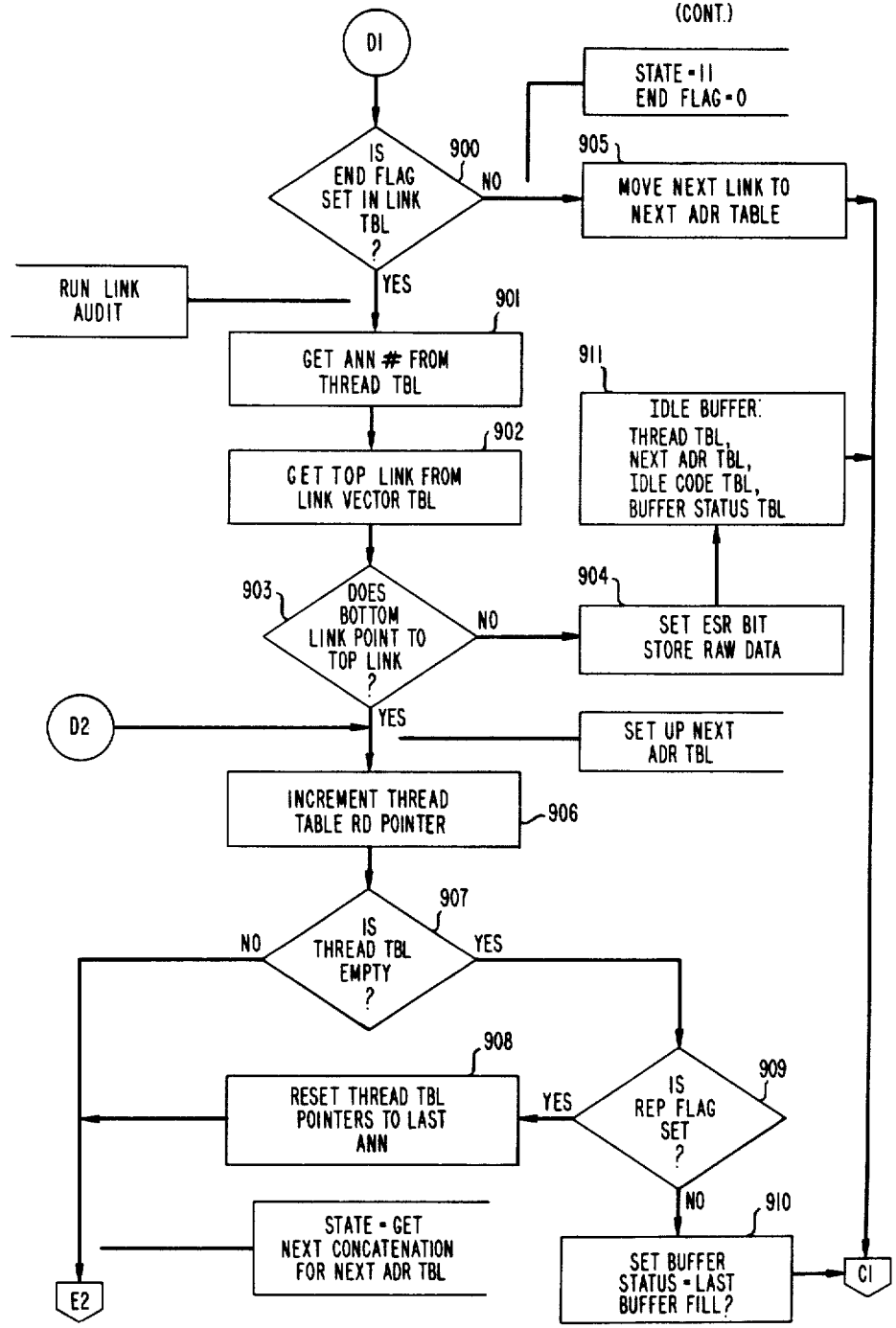

The peripheral interface controller 204 continues processing according to the flow chart shown in FIGS. 8-10 until all playback buffers have been serviced as indicated by the execution of the YES branch of box 800. At that time, any record work is done and the subroutine is exited and a transfer is made to the FLYBACK subroutine.

Once having combined the new playback work with the ongoing work, the temporary FORWARD tables are sorted and placed in ONE SECOND and HALF-SECOND FORWARD tables. This is accomplished when peripheral interface controller 204 executes a subroutine named SORT which is disclosed in the flow chart of FIG. 14.

The SORT routine sorts the disc address tables which cause the disc heads to move in a sequential non-random manner as successive disc jobs are done. FORWARD table jobs will move the heads from the lower numbered disc cylinders to the higher disc numbers while BACKWARD table jobs cause the disc heads to move in the reverse direction. Each entry in the FORWARD table contains two words, the first word is the disc address and the second word is the playback buffer into which the disc message segment will be read. Since the sort is made by disc address only, the first word is used to determine the order of the final sorted table, and the playback numbers associated therewith are carried along with the disc address.

Input to the SORT subroutine is the temporary FORWARD or BACKWARD tables with the disc addresses to be sorted and an address counter indicating the active entries. Two items are then taken off the table and masked so that items can be sorted by disc address (boxes 1402, 1403). The disc addresses are compared and the smallest one is saved when peripheral interface controller 204 executes boxes 1404-1406. Controller 204 then loops through this portion of the subroutine until all items are examined and the smallest one is found.

When the smallest items, i.e., the item with the lowest disc address is found, it is removed from the temporary table and written into the SORT (one-second FORWARD, half-second FORWARD, or intermediate BACKWARD) table as described by the operations in boxes 1407 and 1408.

If all items have been processed, the SORT subroutine is exited as shown by the execution of the YES branch of decision box 1411. If not, peripheral interface controller 204 reloads the temporary table and finds the smallest item of the remaining disc addresses. This item is saved, and so on, and the process continues until all items are ranked from the lowest disc address to the highest. As mentioned, the PREPROCESSING and SORT subroutines described above will prepare the HALF-SECOND and ONE SECOND FORWARD tables that will be processed during the next base cycle. It also will be recalled that while these orders for playback messages that have been sorted during preprocessing are being executed, orders for additional playback messages may be received by peripheral interface controller 204.

In accordance with a feature of the invention, the requests that are received during this interval (i.e., the initial ¾ second of base cycle) are processed and sorted in a reverse manner so that these orders may be executed as the reading heads are returning to their original position on cylinder 0. More specifically, when the base cycle reaches the 750 ms point, peripheral interface controller 204 ascertains if there is sufficient time to process any mandatory data work and also to do post-processing. The controller performs this function by executing the YES branch of box 404 of the BASE CYCLE routine and performing the functions described by the subroutines in FIGS. 5 and 11-13.

During the post-processing operation, announcement numbers are moved from the PLAYBACK INPUT QUEUE into the THREAD table. The NEXT ADDRESS table is updated with the appropriate data depending into the entries in the THREAD and BUFFER STATUS tables and the disc data entries are placed in a temporary BACKWARD table. The table entries are sorted in the reverse order and placed in their actual assignments in RAM 214 of peripheral interface controller system 204 to be used by other routines. No record work is processed during the POST-PROCESSING routine in this embodiment.

Figure 11:
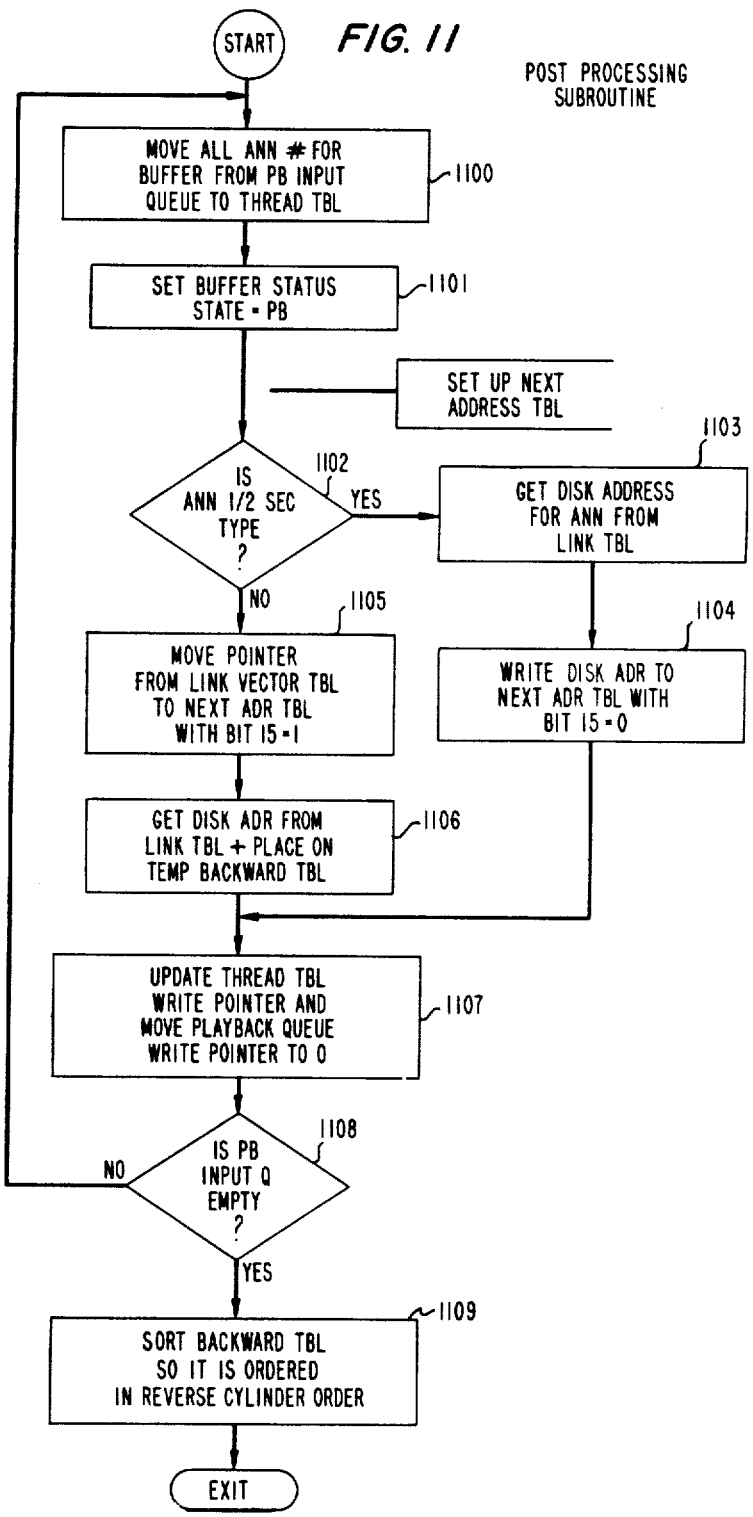
FIGS. 11–13 show the sequence of operations of the POST-PROCESSING and NXATUD routines which cause the data store to play back announcements as the reading heads are being returned to their starting position.

Upon entering into the POST-PROCESSING subroutine in FIG. 11, all announcement numbers from the PLAYBACK INPUT QUEUE are moved to the THREAD table and the buffer status is set to a playback status as shown in boxes 1100 and 1101. A determination is then made by executing box 1102 as to whether this is a one-second or half-second announcement. This is accomplished by peripheral interface controller 204 performing the functions in boxes 1103-1106. If a one-second announcement is indicated, the LINK VICTOR table is read to ascertain the LINK ADDRESS table of the announcement which is then placed in the NEXT ADDRESS table. The actual LINK ADDRESS is then placed in a temporary BACKWARD table as shown in box 1106.

To sort the items to be played back in the return of the heads, the SORT subroutine shown in FIG. 14 is executed to first sort the disc addresses in the forward direction. Another subroutine designated XCHG, which has not been shown in the drawing, is then called to "flip" the sorted list and cause the items to be entered in the BACKWARD table with the largest item listed first.

It should be noted that when decision box 1102 is executed, if the announcement is a half-second announcement, its disc address is not entered in the BACKWARD table for sorting. Half-second announcements in this embodiment are not processed for playback as the heads are returning to cylinder 0. These announcements are saved and "ordered" in the forward direction along with new playback requests and they are played during the next base cycle of operation.

As mentioned above, when the BASE CYCLE routine is being executed after the 750 ms point is reached, the POST-PROCESSING subroutine is executed to sort the playback orders to be processed as the heads return to cylinder 0.

Upon returning to the BASE CYCLE program, the processor calls the subroutine BACKJB if there is sufficient time to execute a playback order and still have sufficient time to return the heads to cylinder 0. The BACKJB and NXATUD subroutines are continuously called until all pending playback orders have been processed if time permits. If time runs out, the FLYBACK subroutine must be executed.

Figure 12:
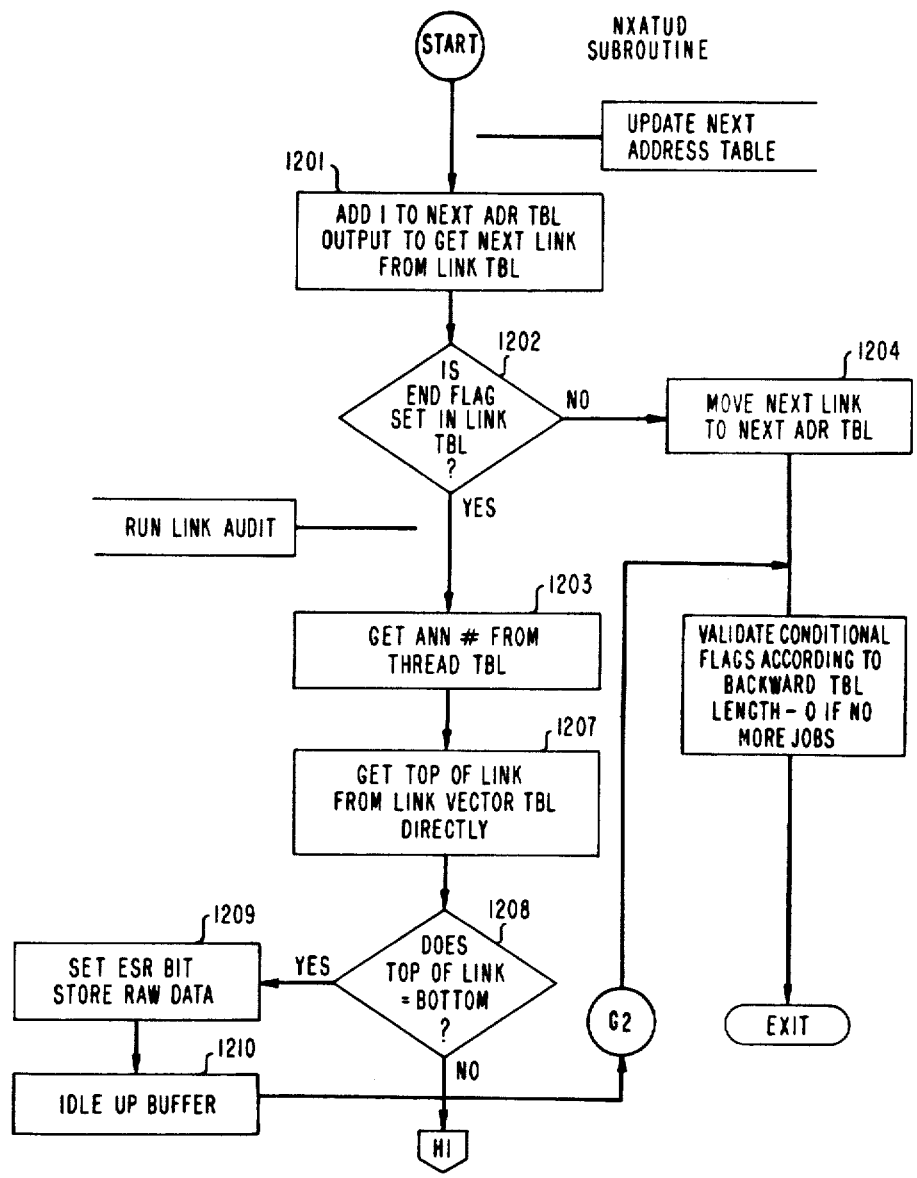
Figure 13:
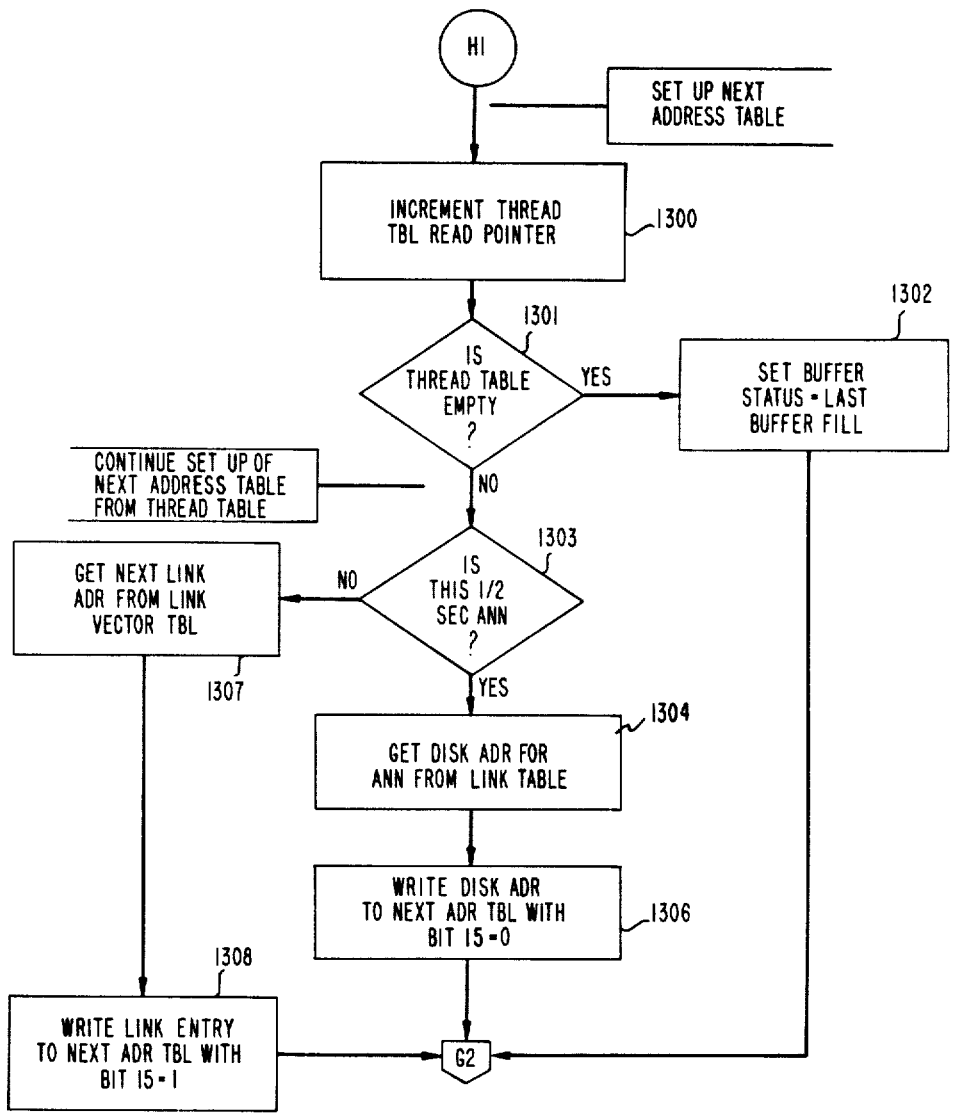

The NXATUD subroutine, for updating the NEXT ADDRESS table, is shown in FIGS. 12 and 13 and is similar in function to a portion of the PREPROCESSING subroutine priorly described. BACKJB is similar to ONESJB and HALFJB except that the playback orders that are to be processed are taken from the BACKWARD table instead of the FORWARD tables as described with respect to preprocessing operation.

In summary, an announcement system is disclosed wherein a plurality of short phrases are stored in corresponding sectors of a disc store and wherein complete announcements are assembled in real time by concatenating the appropriate phrases.

The disc store is read by moving the reading heads across the face of the disc in such a manner that the announcements are promptly played back to the listeners. More specifically, the initial requests for playback are sorted so the reading heads can seek in a straight line from the outermost sectors to the inner sectors. If additional requests for playback are received during the interval that the initial requests are being played back, the additional requests are sorted in the reverse order. This permits the additional requests to be played back as the heads are being returned to the outer sectors saving one BASE CYCLE of startup time for the new requests being serviced during head return. Any further requests are added to unfinished work and sorted for playback during the next cycle when the reading heads are once again traversing the disc from the outer to inner sectors in a straight line seek.

It is to be understood that the above-described arrangements are merely illustrative of the application of the principles of the invention. Numerous other arrangements may be devised by those skilled in the art without departing from the spirit and scope of the invention. For example, the storage media can be a magnetic drum store instead of the disc stores illustrated. Also, it should be obvious that the terms "forward" and "backward" (and similar terms) are only used for descriptive purposes and other terms may be equally applicable depending on the physical arrangement of the equipment.

What is claimed is:

1. In an announcement system comprising a store having a plurality of memory sectors for storing prerecorded messages, a reading head and means responsive to requests for the playback of messages for moving the reading head to selected sectors to read the contents therof, a method for playing back messages comprising the steps of:
   accumulating in real time requests for the playback of a plurality of first messages and establishing a first rank order of the sectors associated therewith prior to reading the associated sectors to minimize the head travel when the reading head is to be moved in a forward direction to the sectors associated with the first messages,
   reading according to the first rank order the contents of the sectors associated with the first messages while accumulating in real time requests for the playback of a plurality of second messages,
   establishing a second rank order of the sectors associated with the second messages prior to reading the sectors associated with the second messages to minimize the head travel when the reading head is to be moved in a reverse direction to the sectors associated with the second messages, and
   reading according to the second rank order the sectors associated with the second messages.

2. The method set forth in claim 1 further comprising the steps of classifying the messages as long messages and short messages, and wherein the step of establilshing the second rank order includes arranging only sectors associated with long messages.

3. In an announcement system comprising a store having a plurality of memory sectors for storing prerecorded messages, a reading head and means responsive to requests for the playback of messages for moving the reading head to selected sectors to read the contents thereof, a method for playing back messages comprising the steps of:
   ordering a first set of sectors associated with a first plurality of messages in a first sequence to minimize the head travel necessary to read the first set of sectors when the heads are moved in a forward direction,
   reading the first set of sectors by moving the head according to the first sequence while accumulating in real time requests for the playback of a second plurality of messages,
   ascertaining that the time utilized for reading the first set of sectors is less than a predetermined amount,
   ordering a second set of sectors associated with the second messages in a second sequence to minimize the head travel necessary to read the second set of sectors when the heads are moved in a reverse direction, and
   reading the second set of sectors according to the second sequence.

4. The method set forth in claim 3 further comprising the step of ordering the second set of sectors in the first sequence when the time utilized to read the first set of sectors exceeds the predetermined amount.

5. For use in an announcement system having a disc memory wherein prerecorded messages are stored in annular tracks of said disc and, wherein responsive to the receipt of playback requests, a reading head is moved to selected ones of the tracks to read the messages stored therein, a method for servicing said requests within a prescribed interval of time comprising the steps of:
   identifying a first set of track locations associated with a plurality of first received requests for playback,
   sorting the first set of track locations in ascending order,
   causing the reading head to seek to each of the first set of track locations in ascending order while identifying a second set of track locations for requests received subsequent to said first requests,
   ascertaining the time interval remaining in said prescribed interval,
   sorting the second set of track locations in descending order when a predetermined time interval remains and in ascending order when less than said predetermined interval remains in the prescribed interval, and
   causing the reading head to seek to each of the second set of track locations according to the result of the last-mentioned sort.

6. The method set forth in claim 5 wherein the step of identifying a track location includes classifying the contents stored in the location into at least two classes, and wherein the step of sorting the second set of track locations in descending order only sorts messages of one of said classes.

7. The method set forth in claim 6 wherein the step of sorting track locations in an ascending order includes sorting all said classes.

8. For use in an announcement system for composing announcements in real time from a plurality of prerecorded phrases, said system comprising a disc storage unit for storing said phrases on addressable sectors of said disc and a reading head movable to each said sector for playing back the contents stored therein in response to requests from said announcement system, a method for controlling the playing back of said phrases comprising the steps of:

translating a plurality of first requests into a first set of sector addresses associated with the requested phrases, listing the first set of addresses in a first order wherein consecutive addresses represent disc sectors in closest proximity to each other, moving the reading head from an initial position in a first direction according to the first order of addresses to a final position to read the contents of each sector identified by the first set of addresses, translating a plurality of second requests into a second set of sector addresses before the reading head is returned to the initial position, listing the second set of addresses as a temporary table in said first order, reversing the order of the temporary table, and moving the reading head according to the reverse order from the final position to the initial position to read the contents of each sector identified by the second set of addresses.

9. The invention set forth in claim 8 wherein the phrases comprise relatively long phrases and relatively short phrases and where short phrases are stored on a portion of the disc separate from long phrases, wherein the step of translating includes ascertaining the length of the requested phrase, and wherein the step of listing the second set of addresses includes listing only addresses associated with long phrases.

10. For use in an announcement system for composing announcements in real time from a plurality of prerecorded phrases, said system comprising a disc storage unit for storing said phrases on addressable sectors of said disc and a reading head movable back and forth across said disc to each said sector for playing back the contents stored therein in response to requests from said announcement system, a method for minimizing reading head movement in response to a plurality of requests for the playback of selected phrases comprising the steps of:

accumulating in real time requests for the phases associated with an announcement and storing the requests in a queue, periodically emptying the queue and translating each request therein into the address of a disc sector containing the corresponding phrase, listing the sector addresses so that consecutive addresses represent disc sectors in closest proximity to each other, and moving the reading head to each consecutive address on the list by reading the list from one end when the reading head is closest the periphery of the disc and reading the list from the opposite end when the reading head is closest to the center of the disc.

11. The method set forth in claim 10 further comprising the step of measuring the time interval since the queue was last emptied and wherein the step of moving the reading head by reading the list from the opposite end is performed only if the measured time is less than a predetermined interval.

* * * * *